3,288,776
METALLIZED MONOAZO DYESTUFFS CONTAINING A POLYHALOGENOPYRIMIDYL RADICAL
Jakob Benz, Oberwil, Basel-Land, and Hanspeter Uehlinger, Basel, Switzerland, assignors to Sandoz Ltd. (also known as Sandoz A.G.), Basel, Switzerland
No Drawing. Filed July 1, 1963, Ser. No. 292,158
Claims priority, application Switzerland, Apr. 10, 1959, 71,848
9 Claims. (Cl. 260—146)

This application is a continuation-in-part of our application Ser. No. 20,845, filed April 8, 1960 and now abandoned and relates to the 1:2-chromium and 1:2-cobalt complex compounds of the monoazo dyestuffs of the formula

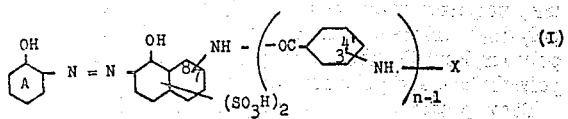

wherein X represents the polyhalogenopyrimidyl radical

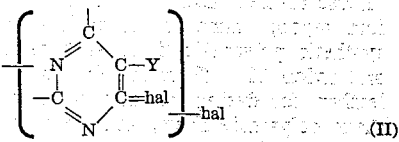

hal being a halogen atom with an atomic number from 17 to 35, inclusive, i.e. being chlorine or bromine,
and Y being a member selected from the group consisting of hydrogen, chlorine and bromine,
$n$ represents one of the integers 1 and 2,
the nucleus A may bear any desired substituents except sulfonic acid groups,
the group

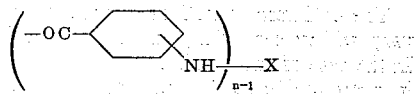

stands in one of the positions 7 and 8 of the naphthalene nucleus and the group —NH— stands in one of the positions 3' and 4'.

A series of particularly interesting dyestuffs comprises the 1:2-chromium and the 1:2-cobalt complex compounds of the dyestuffs of the formula

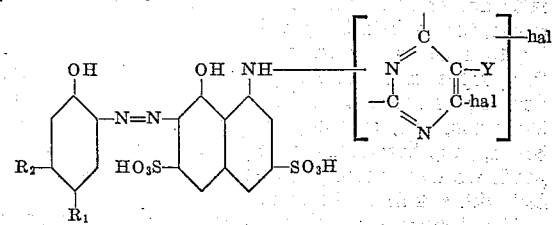

wherein
hal is a halogen atom with an atomic number from 17 to 35, inclusive, i.e. is chlorine or bromine,
Y is hydrogen, chlorine or bromine,
$R_1$ is chlorine or nitro,
and
$R_2$ is hydrogen, chlorine or nitro and is different from $R_1$.

The process for the production of the new chromium- or cobalt-containing reactive dyestuffs consists in reacting with each other 1 mole of the diazo compound of a 2-amino-1-hydroxy-benzene which may contain any desired substituents except sulfonic acid groups, 1 mole of a coupling component of the formula

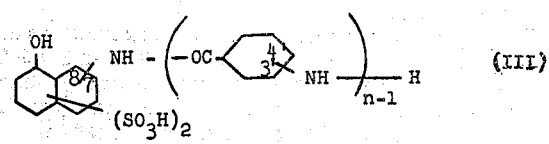

wherein $n$ possesses the afore-cited meaning, and H represents an exchangeable hydrogen atom, and 1 mole of a 2,4,6-trihalogeno- or 2,4,5,6-tetrahalogenopyrimidine, the reaction being conducted in such a manner that the diazo compound is introduced into the position ortho to —OH of the coupling component and the polyhalogenopyrimidyl radical (II) replaces the hydrogen atom H of the coupling component; during or after the formation of the dyestuffs they are treated with a chromium- or cobalt-yielding agent.

A suitable procedure is as follows: 1 mole of a monoazo dyestuff of the formula

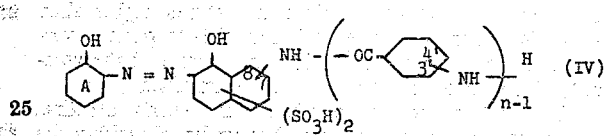

wherein A, H and $n$ have the afore-cited meanings, 1 mole of a 2,4,6-trihalogeno- or 2,4,5,6-tetrahalogenopyrimidine, and a chromium- or cobalt-yielding agent are reacted with each other so that the 2,4,6-trihalogeno- or 2,4,5,6-tetrahalogenopyrimidine reacts with the exchangeable hydrogen atom of the monoazo dyestuff (IV) and the chromium- or cobalt-yielding agent reacts with the ortho-ortho'-dihydroxyazo grouping.

A modification of this procedure consists in coupling in ortho position to the hydroxy group 1 mole of the diazo compound of an amine of the formula

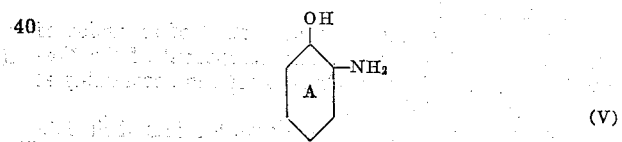

wherein A possesses the above-named meaning, with 1 mole of a coupling component of the formula

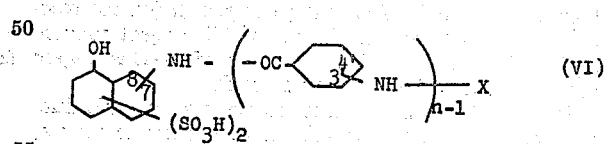

wherein $n$ and X possess the above-named meanings, and treating the resulting monoazo dyestuff with a chromium- or cobalt-yielding agent.

The metal-containing reactive dyestuffss obtained by both procedures are the 1:2-chromium or 1:2-cobalt complex compounds of the monoazo dyestuffs of Formula I. The substituents which, in accordance with the definition, may be contained in the nucleus A are halogen (chlorine, bromine) atoms, lower alkyl or alkoxy groups (methyl, ethyl, methoxy, ethoxy), nitro groups, acylamino (acetyl-, propionyl-, benzoyl-, carbomethoxy-, carbethoxyamino) groups, alkylsulfonyl (methylsulfonyl) and sulfonic acid amide groups which may be substituted on the nitrogen atom (amide, methylamide, ethylamide, dimethylamide, diethylamide, 2 - hydroxyethylamide, di - (2' - hydroxy-ethyl)-amide, 2- or 3-hydroxypropylamide, 3-methoxypropylamide, 3- or 4-methoxybutylamide, 2-ethoxyethylamide, phenylamide, 2-, 3- or 4-methyl-, -methoxy-, -ethoxy-, or -chlorophenylamide, N-methyl-N-phenylamide, N - 2 - hydroxyethyl-N-phenylamide, benzylamide, cyclohexylamide).

The coupling components used as starting materials are the 1-amino-8-hydroxynaphthalene-2.4-, -3.6- and -4.6-disulfonic acids, 2-amino-8-hydroxynaphthalene-3.6-disulfonic acid, and the derivatives of these acids in which the amino group is acylated by an aminobenzoyl radical.

The polyhalogenopyrimidyl radical X is the radical condensed in one of the positions 2 and 4 of 2,4,6-tribromo- or 2,4,5,6-tetrabromopyrimidine or preferably of 2,4,6-trichloro-, 2,4,5,6-tetrachloro- or 2,4,6-trichloro-5-bromopyrimidine.

The reaction of the monoazo dyestuffs of Formula IV or their chromium or cobalt complex compounds with the polyhalogenopyrimidines is carried out in aqueous medium. The halide can be employed as such or in solution in an organic solvent; solvents especially suitable for this purpose are acetone, benzene, chlorobenzene and toluene.

The reaction temperature is varied to suit the reactivity of the individual starting products and may range from e.g. 20 to 100° C. If temperatures higher than about 40° C. are necessary, it is advisable to work in vessels equipped with reflux condensers because of the volatility in steam of the polyhalogenopyrimidines.

The reaction may be conducted in weakly alkaline, neutral to weakly acid medium, but preferably within the pH region 7 to 3. To neutralize the hydrogen halide formed, an acid-binding agent e.g. sodium acetate, is added to the solution at the beginning of the reaction or, alternatively, sodium or potassium carbonate or bicarbonate in solid powdered form or in concentrated aqueous solution is added in small portions in the course of the reaction. Aqueous solutions of sodium or potassium hydroxide are also suitable as neutralizing agents. The addition of small amounts of a wetting or emulsifying agent to the reaction mixture can accelerate the rate of reaction. The reaction is conducted in such a way that only one halogen atom reacts with the exchangeable hydrogen atom H.

The coupling of the diazo compound of an amine of the Formula V with a coupling component of the Formula VI is carried out in alkaline medium, preferably at temperatures of 0–20° C.

The monoazo dyestuffs are converted into their 1:2-chromium or 1:2-cobalt complex compounds preferably in aqueous solution or in an organic medium, e.g. formamide, or in the concentrated aqueous solution of an alkali metal salt of a low molecular aliphatic monocarboxylic acid. It is of advantage to proportion the reactants so that an amount of metal-yielding agent containing less than two but at least one atom of metal acts upon two molecules of the monoazo dyestuff.

Suitable chromium compounds are e.g. chromic fluoride, chromic sulfate, chromic formate, chromic acetate, chromic potassium sulfate or chromic ammonium sulfate. The chromates e.g. sodium or potassium chromate or bichromate, are also eminently suitable for metallizing the monoazo dyestuffs. It is advantageous to work here in a strongly caustic alkaline medium, to which reducing substances may be added if desired.

Cobaltous formate, cobaltous acetate and cobaltous sulfate are examples of suitable cobalt compounds. If metallization is effected in the concentrated aqueous solution of an alkali metal salt of a low molecular aliphatic monocarboxylic acid, water-insoluble metal compounds can be used, e.g. cobalt hydroxide or cobalt carbonate.

It is especially advantageous to carry out metallization in aqueous or alkaline medium to which the metal compounds are added in presence of compounds which maintain the metal dissolved in complex combination in caustic alkaline medium; examples of such compounds are tartaric acid, citric acid and lactic acid.

The metal complex compounds obtained are precipitated from aqueous medium by the addition of salt, if desired after running the organic metallizing solution into brine, and are subsequently filtered off, washed if necessary and dried.

The metal-containing azo dyestuffs thus obtained are homogeneous metal complex compounds in which essentially one atom of metal is linked to two molecules of the monoazo compound. The metal complex compounds are so-called 1:2 complexes in which one molecule of the monoazo compound is linked with approximately 0.3 to 0.7 atom of metal.

The dyestuffs of the invention possess good solubility in water, good stability in printing pastes and padding liquors, good compatibility to salts and hard water; they are practically insensitive to heavy metals such as iron, copper or chromium and reserve cellulose-2½-and-triacetate, polyester fibers such as polyethylene terephthalate, polyvinyl chloride and polyvinyl acetate fibers, pure poly-acrylonitrile fibers and polyalkylene fibers such as polyethylene and polypropylene fibers.

They posses a very good reactivity with vegetable fibers, e.g. cotton and linen, regenerated cellulose, e.g. viscose filament fibers, viscose staple fibers, cuprammonium rayon; animal fibers such as wool and silk and synthetic polyamide fibers such as nylon 6,6, nylon 6 and nylon 11. Therefore they are suitable for dyeing leather, for dyeing, padding or printing wool, silk, synthetic polyamide fibers, and fibers of natural and regenerated cellulose and mixtures of these fibers in violet, dark blue and black shades. The commonly used padding and printing techniques can be applied, e.g. the padding processes: Pad Jig, Pad Steam, Pad Roll, Pad Batch and thermofixation process, and the printing processes named roller printing, screen printing, emulsion printing and vigoureux printing; in these printing processes the dyestuffs are fixed on the substrate by steaming or thermofixation.

The optimum conditions of application of the dyestuffs vary widely depending on the type of fiber to be dyed. In the case of animal fibers and synthetic polyamide fibers it is preferable to dye, pad or print, or alternatively to fix, in a weakly acid, neutral or weakly alkaline medium, e.g. in presence of acetic acid, formic acid, ammonium sulfate, sodium acetate, sodium bicarbonate, sodium or potassium carbonate, sodium meta-phosphate, etc. Dyeing can also be carried out in an acetic acid to neutral bath in presence of levelling agents, e.g. polyoxethylated fatty amines or mixtures of the same with alkylpolyglycol ethers, the dyebath being adjusted on completion of dyeing to a neutral or weakly alkaline reaction, using for this purpose small amounts of an agent of alkaline reaction, e.g. ammonia, sodium bicarbonate, carbonate or hydroxide, etc., or compounds which react alkaline on heating, e.g. hexamethylenetetramine or urea. The dyed goods are then thoroughly washed and if necessary acidified with a little acetic acid.

The dyeings and prints on wool, silk and synthetic polyamide fibers possess good fastness to light, washing, water, sea water, milling, acid and alkaline perspiration, crocking, chlorinated swimming pool water, hypochlorites, peroxides, ironing, acids (dilute acetic acid, dilute tartaric acid in the cold), alkali (sodium bicarbonate, sodium carbonate), gas fumes and organic solvents.

Cellulosic fibers are dyed, padded and printed preferably from alkaline media, e.g. in presence of sodium bicarbonate, sodium carbonate, sodium hydroxide, potassium hydroxide, calcium hydroxide, sodium meta-silicate, sodium borate, water glass, trisodium phosphate, ammonia, trimethylamine, quaternary bases, e.g. tetra-alkylammonium compounds, etc. To prevent reduction reactions during dyeing, padding or printing, it is often advantageous to use a mild oxidizing agent, e.g. sodium 1-nitrobenzene-3-sulfonate. Dyeings on cellulosic fibers are normally fixed by treatment in heat. Provided sufficiently strong alkalis such as sodium or potassium hydroxide, sodium metasilicate or trisodium phosphate are used, a number of the dyestuffs can be applied by cold dyeing methods.

In dyeing, padding and printing applications the dyestuffs can be fixed simultaneously or subsequently, in the same or in a fresh bath, if necessary after intermediate drying. When fixation is carried out in a fresh bath it is advisable to include in it a water-soluble salt, e.g. sodium sulfate, to preclude a partial re-dissolving of the dyestuff in the liquor. After fixation the portion of unreacted dyestuff, i.e. the dyestuff which has not taken part in the chemical reaction with the fiber, must be removed from the dyed or printed material. Owing to the very slight substantivity and the good solubility in water of the new dyestuffs this removal is in general easy and can often be carried out by rinsing with hot water, whereby in case of prints no staining of the unprinted areas appears. Washing at higher temperatures with solutions of soap or of synthetic detergents, e.g. alkylarylsulfonates such as sodium dodecylbenzenesulfonate, alkyl sulfates such as sodium dodecyl, oleyl or cetyl sulfate, optionally sulfated or carboxymethylated alkylpolyglycol, mono- or dialkylphenylpolyglycol ethers, although it is seldom necessary, is nevertheless generally employed in routine padding and printing processes in order to obtain perfect prints and dyeings.

The dyeings and prints on cellulosic fibers possess good fastness to light, gas fumes and hypochlorites, and excellent fastness to water, sea water, washing, soda boiling, acid and alkaline perspiration, crocking, ironing and organic solvents (alcohols, ketones, esters, aromatic and aliphatic hydrocarbons which may be halogenated, pyridine and 1:1-pyridine-water mixture, dimethylformamide, dimethylsulfoxide, etc.), these excellent fastness properties being due to the stable chemical linkage formed between the dyestuff molecule and the cellulose molecule. In addition the dyeings and prints are also very fast to acids (cold dilute acetic and tartaric acid), alkali (sodium bicarbonate and carbonate) peroxides and chlorinated swimming pool water and are very suitable for anticrease treatments (i.e. the anticrease finishing treatment does not affect the fastness to light).

In the following examples the parts and percentages are by weight and the temperatures in degrees centigrade.

EXAMPLE 1

31.9 parts of 1-amino-8-hydroxynaphthalene-3,6-disulfonic acid are dissolved in 160 parts of water by the addition of dilute sodium hydroxide solution at 60° and a pH value of 4.8–5.0. With vigorous stirring 21.8 parts of 2.4.5.6-tetrachloropyrimidine are added, then the reaction medium is heated at 60° for 5–6 hours, during which time its pH is maintained at 4.0–4.2 by dropping in a dilute sodium carbonate solution. On completion of condensation the reaction mass is brought to a temperature of 20° by external cooling and 10.6 parts of sodium carbonate in 50 parts of water are added. Over the next 15 minutes this solution is run into a suspension obtained by diazotization of 14.4 parts of 2-amino-1-hydroxy-4-chlorobenzene and neutralized to Congo with sodium carbonate. After stirring overnight at about 20° the monoazo dyestuff is filtered off and the residue washed with water. The dyestuff paste is suspended in 500 parts of water at 80° and at this temperature 16 parts of cobaltous sulfate heptahydrate are added. The temperature is subsequently maintained at 94–97° for 2½ hours, a constant pH of 5.0–6.0 being maintained by dropwise addition of a dilute sodium carbonate solution. The dyestuff is precipitated by the addition of sodium chloride, filtered off, dried at 70° and ground to give a dark powder which dissolves in water with a blue coloration.

Mercerized cotton sateen is printed with a paste of the following composition:

50 parts of the dyestuff obtained according to the foregoing details
100 parts of urea
375 parts of water
450 parts of a 3% sodium alginate thickening
10 parts of sodium 1-nitrobenzene-3-sulfonate
15 parts of sodium carbonate 1000 parts The print is dried, steamed for 10–15 minutes at 102–104°, rinsed in cold and warm water, soaped at the boil, rinsed again and dried. It is of a reddish navy blue shade possessing good light and wet fastness.

The dyestuff can also be fixed on the fiber by treatment in dry heat for about 5 minutes at 140–150° or for about 1 minute at 200° C. Since the dyestuff is practically non-substantive and well soluble in water, the non-fixed portion can also be removed in the following manner:

The fixed print is washed for 5 minutes in cold water at a goods-to-liquor ratio of 1:40, then put into a new cold water bath (goods-to-liquor ratio of 1:40) which is heated to 100° in the course of 5 minutes and held at 100° C. for 5 minutes. The washed print is withdrawn, rinsed with running tap water and dried. The navy blue print is fast to light and to wet treatments and the unprinted area is perfectly white.

EXAMPLE 2

51.7 parts of the dyestuff (as the disodium salt) from diazotized 2-amino-1-hydroxy-4-chlorobenzene and 1-amino-8-hydroxynaphthalene-3.6-disulfonic acid are stirred into 300 parts of water. At 80° 30 parts of crystallized sodium acetate and 30 parts of crystallized chromic potassium sulfate are added and the mixture is heated for 24 hours with reflux. Subsequently the dyestuff solution is cooled to 80°, 21.8 parts of 2.4.5.6-tetrachloropyrimidine are added and it is stirred for a few hours at 80° with dropwise addition of dilute sodium carbonate solution to maintain the pH value at 5. On completion of condensation the dyestuff is precipitated at 80° by the addition of sodium chloride and filtered off, dried and ground. It is a black powder which dissolves in water to give dark blue solutions.

A cotton fabric is impregnated on a pad with a solution of 8 parts of the above-described dyestuff,
20 parts of urea,
2 parts of sodium carbonate and
100 parts of water, passed between squeeze rollers to give an increase of about 70% on its dry weight and then dried. The dyeing is fixed by treatment in dry heat for 4–5 minutes at 140–150°, rinsed cold and warm, soaped at the boil for 15 minutes with a 0.2% solution of a non-ionic detergent, and finally rinsed and dried. A navy blue shade fast to boiling is obtained.

For the vigoureux printing of wool a paste of the following composition is used:

60 parts of the dyestuff obtained according to the foregoing details
200 parts of urea
535 parts of water
200 parts of 3% sodium alginate thickening
3 parts of a highly sulfonated castor oil 1000 parts The printed slubbing is steamed for two 45-minute periods with intermediate cooling. It is then rinsed with hot and cold water and dried. The obtained navy blue print is fast to light and to wet treatments.

EXAMPLE 3

52.8 parts of the monoazo dyestuff (as the disodium salt) of diazotized 2-amino-1-hydroxy-4-nitrobenzene and 1-amino-8-hydroxynaphthalene-3.6-disulfonic acid are suspended in 300 parts of water at 75°. A solution of 14.5 parts of cobaltous sulfate heptahydrate in 40 parts of water is dropped into the suspension in the course of 30 minutes and at the same time a dilute sodium carbonate solution is dropped in to maintain the pH value of the reaction mass between 5.0 and 6.0. After the addition of the cobaltous sulfate solution the mass is stirred for a further hour at 75°, after which the dyestuff is precipitated with sodium chloride and filtered off.

The cobalt complex compound is dissolved in 300 parts of water and at 80° 22 parts of 2.4.5.6-tetrachloropyrimidine are added. The pH value of the reaction solution is maintained between 3.0 and 4.0 by dropwise addition of a dilute sodium carbonate solution. After stirring for several hours at 80° condensation is completed. By the addition of sodium chloride the dyestuff is precipitated and is then filtered off and dried in vacuo. It is a dark powder which dissolves in water with a reddish black coloration.

Cotton cretonne is printed with a paste of the following composition:

50 parts of the dyestuff obtained according to the foregoing details
100 parts of urea
380 parts of water
450 parts of a 3% sodium alginate thickening,
10 parts of sodium 1-nitrobenzene-3-sulfonate
10 parts of sodium bicarbonate 1000 parts The printed fabric is dried, steamed for 10 minutes at 102–104°, rinsed in cold and warm water, soaped at the boil, rinsed again and dried. A reddish black print with good light and wet fastness is obtained.

*Pad Batch dyeing method*

Mercerized cotton sateen is impregnated at 25° with a padding liquor containing per liter:

50 grams of the above-described dyestuff
150 grams of calcined sodium sulfate
30 grams of sodium metasilicate
20 grams of a 30% sodium hydroxide solution.

The impregnated material is squeezed so that the pick-up of liquor is about 75% of the weight of the dry material, wrapped in a sheet of plastic and stored for 48 hours at 25°. It is then rinsed with cold and with hot water, soaped for 15 minutes at the boil with a solution containing 0.3 gram of a carboxymethylated alkylpolyglycol ether and 0.5 gram of sodium carbonate per liter, rinsed again and dried. The obtained black dyeing is fast to light and to wet treatments.

EXAMPLE 4

52.8 parts of the monoazo dyestuff (as the disodium salt) from diazotized 2-amino-1-hydroxy-4-nitrobenzene and 2-amino-8-hydroxynaphthalene-3.6-disulfonic acid are metallized with cobaltous sulfate according to the details of Example 3.

The cobalt complex compound is dissolved in 300 parts of water. To the solution heated at 80° 18.3 parts of 2.4.6-trichloropyrimidine are added and a 20% sodium carbonate solution is dropped in so that the pH-value is maintained between 4 and 5. When the condensation is completed the dyestuff is precipitated by means of sodium chloride, filtered off, dried and ground. It is a dark powder which dissolves in water with a brownish violet coloration. Mercerized cotton sateen is printed with a paste of the following composition:

50 parts of the dyestuff obtained according to the foregoing details
100 parts of urea
368 parts of water
450 parts of a 3% sodium alginate thickening
20 parts of potassium carbonate
2 parts of a 30% sodium hydroxide solution
10 parts of sodium 1-nitrobenzene-3-sulfonate 1000 parts The dried print is steamed for 10–15 minutes at 102–104° and subsequently rinsed in cold and warm water, soaped at the boil, rinsed again and dried. A violet print with good light and wet fastness is obtained.

EXAMPLE 5

56.3 parts of the dyestuff (in the form of the disodium salt) obtained by coupling diazotized 2-amino-1-hydroxy-4-chloro-5-nitrobenzene with 1-amino-8-hydroxynaphthalene-3.6-disulfonic acid in alkaline medium are stirred into 400 parts of water. The dyestuff suspension is adjusted to a pH value of 5 and after the addition of 18.3 parts of 2.4.6-trichloro-pyrimidine it is stirred for a few hours at 90°, the pH value of the reaction mixture being maintained at 5 by dropwise addition of dilute sodium carbonate solution. When condensation is completed the dyestuff suspension is stirred with 35 parts of crystallized sodium acetate and 16 parts of cobaltous sulfate heptahydrate at 95° until the formation of the metal complex is completed. In the course of metallization the dyestuff goes into solution. By slow addition of sodium chloride at 80° the dyestuff is precipitated and is then filtered off, dried and ground to give a black powder which dissolves in water with a dark blue coloration.

Viscose staple fiber is printed with a paste of the following composition:

60 parts of the dyestuff obtained according to the above details
200 parts of urea
265 parts of water
450 parts of 4% sodium alginate thickening
10 parts of sodium 1-nitrobenzene-3-sulfonate
15 parts of sodium carbonate 1000 parts The print is dried and treated in dry heat for 1 minute at 200° or 10 minutes at 120°, then rinsed in cold and warm water and soaped at the boil. After further rinsing and drying a reddish navy blue print of good light and wet fastness is obtained.

The following table gives details of further chromium- or cobalt-containing reactive dyestuffs which were obtained according to the details of Examples 1 to 5. In the table they are characterized by the diazo and coupling components in columns (I) and (II), by the polyhalogenopyrimidine used in column (III), the metal used for metal complex formation in column (IV) the method of production according to one of the Examples 1 to 5 in column (V) and the shade of the pad dyeings and prints on cotton (c) or wool (w) in column (VI).

| Ex. No. | (I) | (II) | (III) | (IV) | (V) | (VI) |
|---|---|---|---|---|---|---|
| 6 | 2-amino-1-hydroxy-4-chlorobenzene. | 1-amino-8-hydroxynaphthalene-3.6-disulfonic acid. | 2.4.6-trichloropyrimidine | Cr<br>Co | 2<br>3 | Blue (c).<br>Reddish blue (c). |
| 7 | 2-amino-1-hydroxybenzene-4-sulfonic acid-(3'-methyoxpropyl-amide). | do | do | Cr<br>Co | 2<br>4 | Blue (c).<br>Reddish blue (c). |
| 8 | 2-amino-1-hydroxybenzene-4-sulfonic acid methylamide. | do | do | Cr<br>Co | 2<br>3 | Blue (c).<br>Reddish blue (c). |
| 9 | do | do | 2.4.5.6-tetrachloropyrimidine | Co<br>Cr | 3<br>2 | Reddish blue (w).<br>Blue (w). |
| 10 | 2-amino-1-hydroxybenzene-4-sulfonic acid-(2'-hydroxy)-ethylamide. | do | 5-bromo-2.4.6-trichloro-pyrimidine | Cr<br>Co | 2<br>3 | Blue (c).<br>Reddish blue (c). |
| 11 | 2-amino-1-hydroxy-4-chloro-5-nitrobenzene. | do | 2.4.5.6-tetrachloro-pyrimidine | Cr | 2 | Navy blue (c). |
| 12 | 2-amino-1-hydroxy-4-chloro-6-nitrobenzene. | do | 2.4.6-tribromo-pyrimidine | Cr | 2 | Do. |
| 13 | 2-amino-1-hydroxy-4-nitrobenzene. | do | 2.4.5.6-tetrachloro-pyrimidine | Cr | 2 | Greenish black (c). |
| 14 | 2-amino-1-hydroxy-4-chloro-6-nitrobenzene. | do | do | Co | 3 | Reddish navy (c). |
| 15 | 2-amino-1-hydroxy-4.6-dinitrobenzene. | 1-amino-8-hydroxy-naphthalene-3.6-disulfonic acid. | 2.4.5.6-tetrabromo-pyrimidine | Co<br>Cr | 3<br>2 | Greenish black (c).<br>Bluish black (c). |
| 16 | 2-amino-1-hydroxy-6-nitrobenzene-4-sulfonic acid amide. | 1-(3-amino)-benzoylamino-8-hydroxy-naphthalene-3.6-disulfonic acid. | 2.4.6-trichloro-pyrimidine | Cr | 2 | Navy blue (c). |
| 17 | 2-amino-1-hydroxy-4-chlorobenzene. | 1-amino-8-hydroxy-naphthalene-3.6-disulfonic acid. | 5-bromo-2.4.6-trichloropyrimidine | Cr<br>Co | 2<br>3 | Navy blue (c).<br>Reddish navy blue (c). |
| 18 | 2-amino-1-hydroxy-4-nitrobenzene. | do | do | Cr | 2 | Navy blue (c). |
| 19 | 2-amino-1-hydroxy-benzene-4-sulfonic acid amide. | do | 2.4.6-trichloropyrimidine | Cr<br>Co | 2<br>3 | Navy blue (w).<br>Reddish navy blue (w). |
| 20 | 2-amino-1-hydroxy-4-nitrobenzene. | 1-amino-8-hydroxy-naphthalene-4.6-disulfonic acid. | do | Cr<br>Co | 1<br>5 | Blue (c).<br>Violet (c). |
| 21 | 2-amino-1-hydroxy-4-chlorobenzene. | 1-amino-8-hydroxy-naphthalene-4.6-disulfonic acid. | do | Cr<br>Co | 2<br>3 | Blue (c).<br>Violet (c). |
| 22 | 2-amino-1-hydroxy-benzene-4-sulfonic acid amide. | do | do | Cr | 2 | Navy blue (w). |
| 23 | do | do | 2.4.5.6-tetrabromopyrimidine | Cr | 2 | Navy blue (c). |
| 24 | do | do | 2.4.6-tribromopyrimidine | Cr | 2 | Do. (c). |
| 25 | 2-amino-1-hydroxy-4-chloro-benzene. | 2-amino-8-hydroxy-naphthalene-3.6-disulfonic acid. | 24.6-tribomopyrimidine | Co<br>Cr | 3<br>2 | Violet (c).<br>Do. |
| 26 | do | do | 2.4.5.6-tetrachloropyrimidine | Co<br>Cr | 3<br>2 | Violet (c).<br>Do. |
| 27 | 2-amino-1-hydroxy-4-nitro-benzene. | do | 2.4.6-trichloropyrimidine | Cr | 2 | Gray (c). |
| 28 | 2-amino-1-hydroxy-4-chloro-5-nitrobenzene. | do | 2.4.5.6-tetrachloropyrimidine | Cr | 2 | Bluish gray (c). |
| 29 | 2-amino-1-hydroxy-4-chloro-6-nitrobenzene. | do | do | Cr | 2 | Violet (c). |
| 30 | 2-amino-1-hydroxy-4-chloro-6-nitrobenzene. | do | 2.4.6-trichloropyrimidne | Cr | 2 | Violet (c). |
| 31 | 2-amino-1-hydroxy-4-nitro-6-chlorobenzene. | do | 2.4.6-trichloropyrimidine | Cr | 2 | Bluish gray (c). |
| 32 | do | do | 2.4.5.6-tetrachloropyrimidine | Co | 3 | Reddish gray (c). |
| 33 | 2-amino-1-hydroxy-4.6-dinitrobenzene. | do | do | Cr | 2 | Red-violet (c). |
| 34 | do | do | 2.4.6-trichloropyrimidine | Cr | 1 | Do. |
| 35 | 2-amino-1-hydroxy-4-chloro-benzene. | 1-amino-8-hydroxy-naphthalene-2.4-disulfonic acid. | do | Cr | 2 | Blue (c). |
| 36 | 2-amino-1-hydroxy-4-nitro-6-chlorobenzene. | 1-(4'-amino)-benzoyl-amino-8-hydroxynaphthalene-3.6-disulfonic acid. | 2.4.6-trichloropyrimidine | Cr | 2 | Blue (c). |
| 37 | 2-amino-1-hydroxy-3.4.6-trichlorobenzene. | 1-amino-8-hydroxynaphthalene-3.6-disulfonic acid. | 2.4.5.6-tetrachloropyrimidine | Cr | 2 | Navy blue (c). |
| 38 | 2-amino-1-hydroxy-4-nitrobenzene. | do | 2.4.6-trichloropyrimidine | Co<br>Cr | 3<br>2 | Reddish black (c).<br>Greenish black (c). |
| 39 | 2-amino-1-hydroxy-4-bromobenzene. | 1-amino-8-hydroxynaphthalene-3.6-disulfonic acid. | 2.4.5.6-tetrachloropyrimidine | Cr<br>Co | 2<br>3 | Blue (c).<br>Reddish blue (c). |
| 40 | 2-amino-1-hydroxy-4-methylbenzene. | do | 2.4.6-trichloropyrimidine | Cr<br>Co | 2<br>3 | Reddish blue (c).<br>Reddish blue (c). |
| 41 | 2-amino-1-hydroxy-4-methoxybenzene. | do | do | Cr<br>Co | 2<br>3 | Reddish blue (c).<br>Reddish blue (c). |
| 42 | 2-amino-1-hydroxy-6-acetylamino-4-nitrobenzene. | do | do | Co<br>Cr | 3<br>2 | Reddish black (c).<br>Greenish black (c). |
| 43 | 2-amino-1-hydroxy-4-methylsulfonylbenzene. | do | do | Cr<br>Co | 2<br>3 | Blue (w).<br>Reddish blue (w). |
| 44 | 2-amino-1-hydroxy-benzene-4-sulfonic acid phenylamide. | do | 2.4.5.6-tetrachloropyrimidine | Cr<br>Co | 2<br>3 | Blue (w).<br>Reddish blue (w). |
| 45 | 2-amino-1-hydroxybenzene-4-sulfonic acid benzylamide. | do | do | Cr<br>Co | 2<br>3 | Blue (c).<br>Reddish blue (c). |
| 46 | 2-amino-1-hydroxybenzene-4-sulfonic acid cyclohexylamide. | 1-amino-8-hydroxynaphthalene-3.6-disulfonic acid. | 2.4.5.6-tetrachloropyrimidine | Cr<br>Co | 2<br>3 | Blue (w).<br>Reddish blue (w). |
| 47 | 2-amino-1-hydroxy-4-ethylsulfonylbenzene. | do | 2.4.5.6-tetrachloropyrimidine | Cr<br>Co | 2<br>3 | Blue (c).<br>Reddish blue (c). |
| 48 | 2-amino-1-hydroxybenzene-4-sulfonic acid ethylamide. | do | do | Cr<br>Co | 2<br>3 | Blue (c).<br>Reddish blue (c). |
| 49 | 2-amino-1-hydroxybenzene-4-sulfonic acid dimethylamide. | do | do | Cr<br>Co | 2<br>3 | Blue (w).<br>Reddish blue (w). |
| 50 | 2-amino-1-hydroxybenzene-4-sulfonic acid-(3'-hydroxy)-propylamide. | do | do | Cr<br>Co | 2<br>3 | Blue (c).<br>Reddish blue (c). |
| 51 | 2-amino-1-hydroxy-4-ethylbenzene. | do | do | Cr<br>Co | 2<br>3 | Reddish blue (c).<br>Reddish blue (c). |
| 52 | 2-amino-1-hydroxy-4-nitro-6-carbethoxyaminobenzene. | do | do | Cr | 2 | Blue (c). |
| 53 | 2-amino-1-hydroxybenzene-4-sulfonic acid-(2'-carboxy)-phenylamide. | do | do | Cr | 2 | Blue (w). |
| 54 | 2-amino-1-hydroxy-4-nitro-6-benzoylaminobenzene. | do | do | Cr | 2 | Reddish black (c). |
| 55 | 2-amino-1-hydroxy-4-nitro-6-propionylaminobenzene. | 1-amino-8-hydroxynaphthalene-4.6-disulfonic acid. | 2.4.6-trichloropyrimidine | Cr | 2 | Greenish black (c). |
| 56 | 2-amino-1-hydroxy-4-ethoxybenzene. | do | do | Cr | 2 | Reddish blue (c). |
| 57 | 2-amino-1-hydroxybenzene-4-sulfonic acid di-(2'-hydroxy-ethyl)-amide. | do | 2.4.5.6-tetrachloropyrimidine | Co | 4 | Reddish blue (w). |

| Ex. No. | (I) | (II) | (III) | (IV) | (V) | (VI) |
|---|---|---|---|---|---|---|
| 58 | 2-amino-1-hydroxybenzene-4-sulfonic acid N-methyl-N-phenylamide. | 2-amino-8-hydroxynaphthalene-3.6-disulfonic acid. | 2.4.5.6-tetrachloropyrimidine | Cr | 1 | Blue (w). |
| 59 | 2-amino-1-hydroxybenzene-4-sulfonic acid diethylamide. | 1-amino-8-hydroxynaphthalene-3.6-disulfonic acid. | do | Co | 4 | Reddish blue (w). |
| 60 | 2-amino-1-hydroxybenzene-4-sulfonic-acid N-2'-hydroxyethyl-N-phenylamide. | 1-amino-8-hydroxynaphthalene-3.6-disulfonic acid. | do | Cr | 2 | Blue (w). |
| 61 | 2-amino-1-hydroxybenzene-4-sulfonic acid di-(3'-hydroxypropyl)-amide. | 1-(4'-amino)-benzoylamino-8-hydroxynaphthalene-3.6-disulfonic acid. | do | Cr | 2 | Navy blue (c). |
| 62 | 2-amino-1-hydroxybenzene-4-sulfonic acid-(3'-sulfamyl)-phenylamide. | do | do | Cr | 2 | Navy blue (c). |
| 63 | 2-amino-1-hydroxy-4-chloro-6-carbomethoxyaminobenzene. | 1-amino-8-hydroxynaphthalene-4.6-disulfonic acid. | do | Co | 3 | Reddish blue (c). |
| 64 | 2-amino-1-hydroxybenzene-4-sulfonic acid n-propylamide. | 1-amino-8-hydroxynaphthalene-3.6-disulfonic acid. | 2.4.6-tribromopyrimidine | Cr | 2 | Blue (w). |
| 65 | 2-amino-1-hydroxybenzene-4-sulfonic acid-(2'-ethoxy)-ethylamide. | 1-amino-8-hydroxynaphthalene-3.6-disulfonic acid. | 2.4.5.6-tetrabromopyrimidine | Co | 3 | Reddish blue (c). |
| 66 | 2-amino-1-hydroxybenzene-4-sulfonic acid-(4'-methoxy)-butylamide. | 1-(3'-amino)-benzoylamino-8-hydroxynaphthalene-4.6-disulfonic acid. | 2.4.6-trichloropyrimidine | Cr | 2 | Blue (w). |
| 67 | 2-amino-1-hydroxybenzene-4-sulfonic acid-(4'-methyl)-cyclohexylamide. | 2-(4'-amino)-benzoylamino-8-hydroxynaphthalene-3.6-disulfonic acid. | do | Cr | 2 | Blue (c). |
| 68 | 2-amino-1-hydroxybenzene-4-sulfonic acid-(2'-methoxy)-phenylamide. | 1-amino-8-hydroxynaphthalene-3.6-disulfonic acid. | do | Cr | 2 | Blue (c). |
| 69 | 2-amino-1-hydroxybenzene-4-sulfonic acid-(3'-chloro)-phenylamide. | do | do | Cr | 2 | Blue (c). |
| 70 | 2-amino-1-hydroxybenzene-4-sulfonic acid-(4'-methyl)-phenylamide. | do | do | Cr | 2 | Blue (c). |

Formulae of representative dyestuffs of the foregoing examples are as follows:

EXAMPLE 1

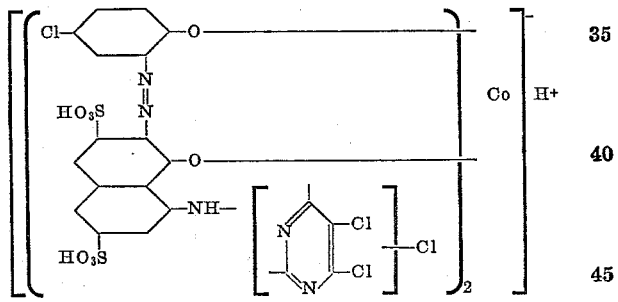

EXAMPLE 2

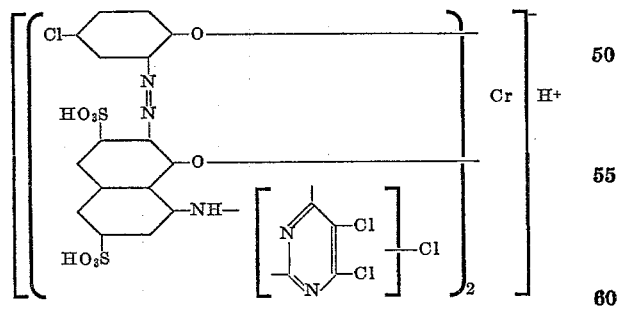

EXAMPLE 3

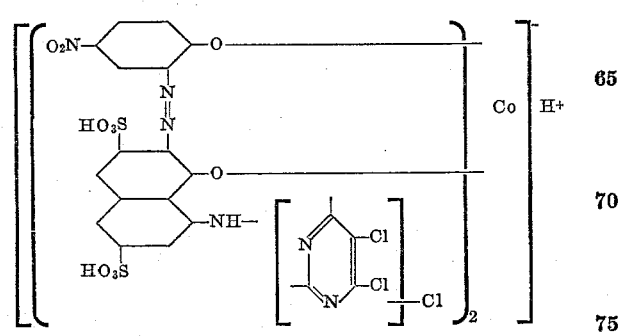

EXAMPLE 4

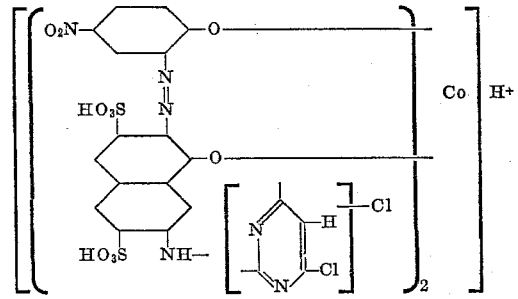

EXAMPLE 5

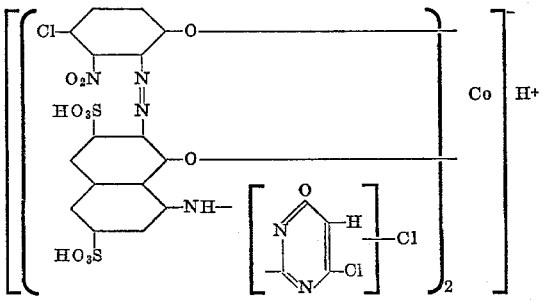

EXAMPLE 6 (FIRST DYESTUFF)

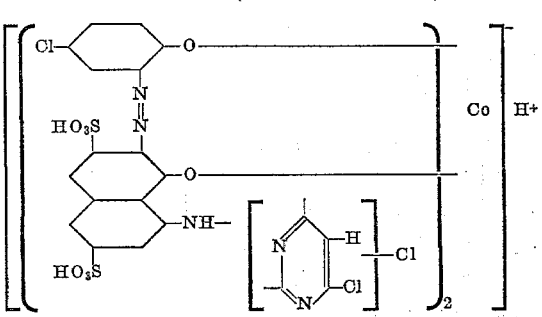

EXAMPLE 6 (SECOND DYESTUFF)

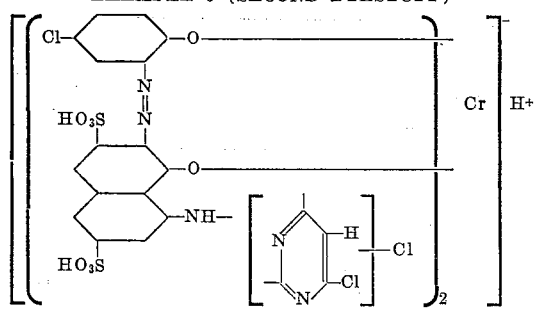

EXAMPLE 10

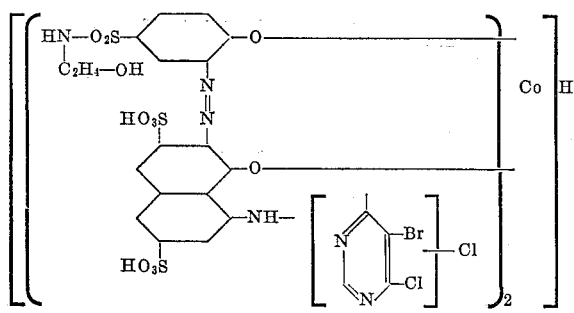

EXAMPLE 13

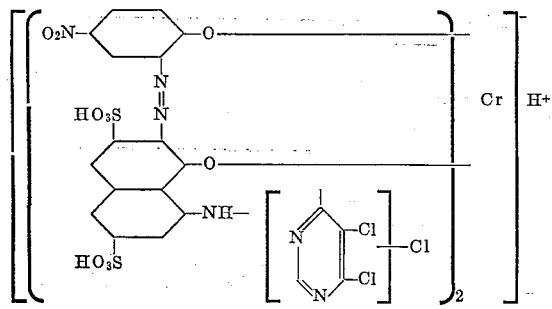

EXAMPLE 38 (FIRST DYESTUFF)

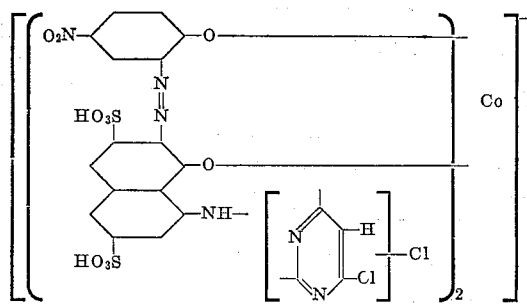

EXAMPLE 38 (SECOND DYESTUFF)

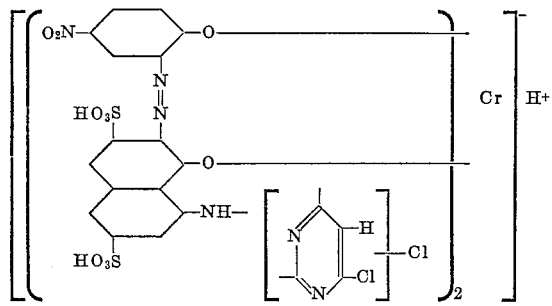

Having thus disclosed the invention what we claim is:
1. A member selected from the group consisting of the 1:2-chromium and the 1:2-cobalt complex compounds of the dyestuff of the formula

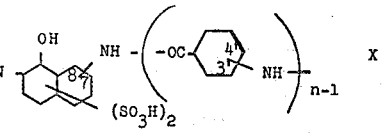

wherein

X is the polyhalogenopyrimidyl radical of the formula

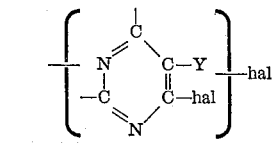

hal being a halogen atom with an atomic number from 17 to 35, inclusive,
and Y being a member selected from the group consisting of hydrogen, chlorine and bromine,
$w$ is a member selected from the group consisting of hydrogen and chlorine,
$y$ is a member selected from the group consisting of hydrogen, chlorine and nitro,
$z$ is a member selected from the group consisting of chlorine, bromine, nitro, lower alkyl, lower alkoxy, lower alkanoylamino, lower carboalkoxyamino, benzoylamino, lower alkylsulfonyl, sulfonic acid amide, sulfonic acid lower alkylamide, sulfonic acid lower hydroxyalkylamide, sulfonic acid lower alkoxyalkylamide, sulfonic acid di-(lower alkyl)-amide, sulfonic acid di-(lower hydroxyalkyl)-amide, sulfonic acid phenylamide, sulfonic acid carboxy-phenylamide, sulfonic acid sulfamylphenylamide, sulfonic acid N-lower alkyl-N-phenylamide, sulfonic acid N-lower hydroxyalkyl-N-phenylamide, sulfonic acid cyclohexylamide, sulfonic acid benzylamide, sulfonic acid lower alkylphenylamide, sulfonic acid lower alkoxyphenylamide and sulfonic acid chlorophenylamide, and $n$ is one of the integers 1 and 2, the group

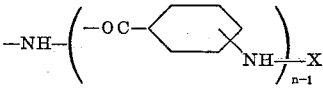

stands in one of the positions 7 and 8 of the naphthalene nucleus, and the group, —NH— stands in one of the positions 3' and 4'.

2. The cobalt-containing reactive dyestuff of the formula

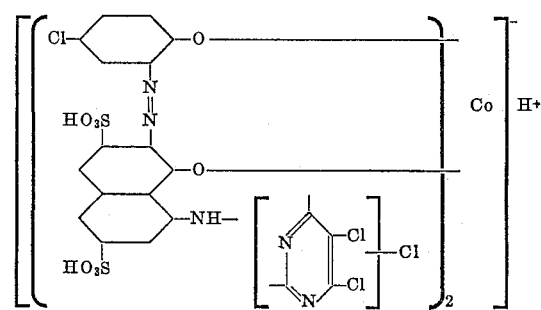

3. The chromium-containing reactive dyestuff of the formula

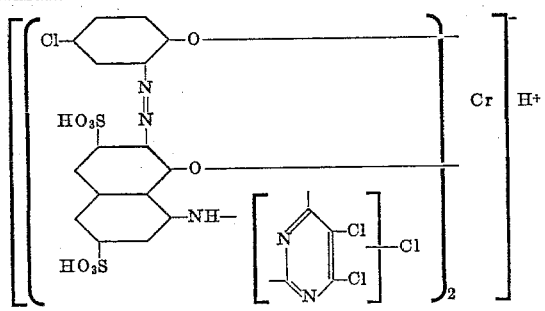

4. The cobalt-containing reactive dyestuff of the formula

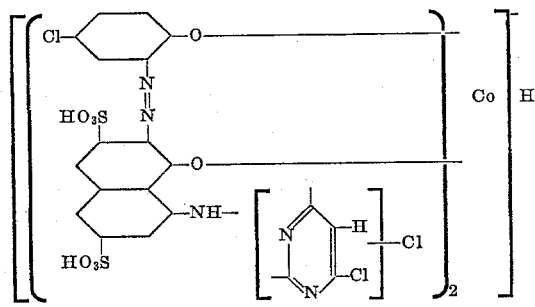

5. The chromium-containing reactive dyestuff of the formula

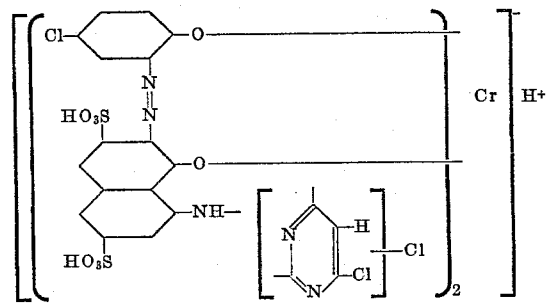

6. The cobalt-containing reactive dyestuff of the formula

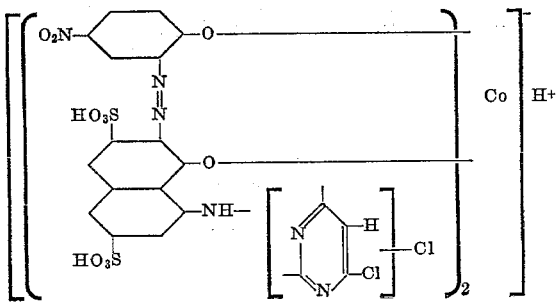

7. The chromium-containing reactive dyestuff of the formula

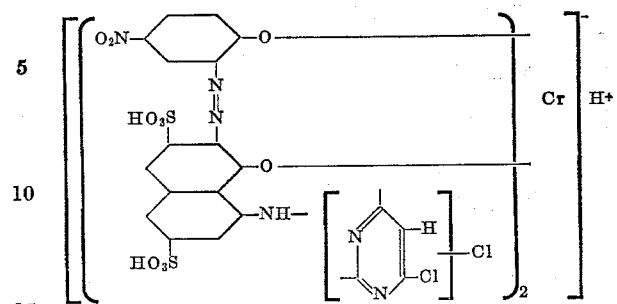

8. The cobalt-containing reactive dyestuff of the formula

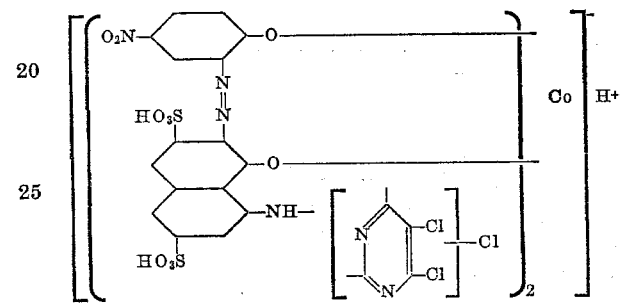

9. The chromium-containing reactive dyestuff of the formula

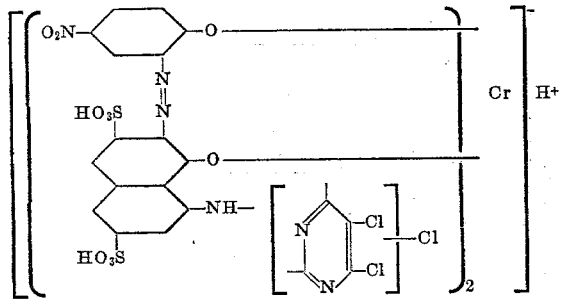

References Cited by the Examiner

UNITED STATES PATENTS

| | | | |
|---|---|---|---|
| 1,667,312 | 4/1928 | Fritzsche et al. | 260—153 |
| 1,886,480 | 11/1932 | Haller et al. | 260—146 |
| 3,125,564 | 3/1964 | Heslop et al. | 260—153 |

FOREIGN PATENTS

| | | |
|---|---|---|
| 569,115 | 1/1959 | Belgium. |
| 1,221,621 | 1/1960 | France. |
| 1,225,281 | 2/1960 | France. |

CHARLES B. PARKER, *Primary Examiner.*

R. J. FINNEGAN, *Assistant Examiner.*